United States Patent
Kitagawa (10) Patent No.: US 10,715,685 B2
(45) Date of Patent: Jul. 14, 2020

(54) DETERMINING WHETHER SESSION IDS MATCH AND TAKING ACTION ACCORDINGLY

(71) Applicant: CANON KABUSHIKI KAISHA, Tokyo (JP)

(72) Inventor: Kan Kitagawa, Odawara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/159,978

(22) Filed: Oct. 15, 2018

(65) Prior Publication Data

US 2019/0124214 A1 Apr. 25, 2019

(30) Foreign Application Priority Data

Oct. 25, 2017 (JP) .................. 2017-206332

(51) Int. Cl.
  *G06F 3/12* (2006.01)
  *H04N 1/00* (2006.01)
  *H04N 1/21* (2006.01)

(52) U.S. Cl.
  CPC ....... *H04N 1/00217* (2013.01); *G06F 3/1206* (2013.01); *G06F 3/1236* (2013.01); *G06F 3/1284* (2013.01); *H04N 1/00172* (2013.01); *H04N 1/2158* (2013.01); *H04N 2201/0039* (2013.01); *H04N 2201/0094* (2013.01)

(58) Field of Classification Search
  CPC ............ H04N 1/00217; H04N 1/00172; G06F 3/1206; G06F 3/1236
  See application file for complete search history.

(56) References Cited

U.S. PATENT DOCUMENTS

| | | | | |
|---|---|---|---|---|
| 2014/0122733 A1* | 5/2014 | Kadota | .................. | G06F 21/608 709/228 |
| 2017/0090832 A1* | 3/2017 | Ishibashi | ................ | G06F 3/1222 |
| 2018/0103160 A1* | 4/2018 | Sugita | ................ | H04N 1/00228 |

FOREIGN PATENT DOCUMENTS

JP 2014089675 A 5/2014

\* cited by examiner

*Primary Examiner* — Eric A. Rust

(74) *Attorney, Agent, or Firm* — Venable LLP

(57) ABSTRACT

According to an embodiment of this invention, there is provided a method in which even if, in an environment where an information processing apparatus and an image processing apparatus are connected by USB, communication from the information processing apparatus is terminated midway, processing on the image processing apparatus side is terminated. In this method, an HTTP communication module transmits, to the image processing apparatus, request information including information for identifying communication with the image processing apparatus. If response information, from the image processing apparatus, corresponding to the request information does not match the transmitted request information, the HTTP communication module transmits an instruction to operate the image processing apparatus in a status in which it is possible to transmit the response information.

14 Claims, 10 Drawing Sheets

FIG. 3

DETERMINING WHETHER SESSION IDS MATCH AND TAKING ACTION ACCORDINGLY

BACKGROUND OF THE INVENTION

Field of the Invention

The present invention relates to a technique in which a communication apparatus manages communication with a communication partner apparatus and, more particularly to, for example, communication apparatuses that are connected by USB and perform HTTP communication, a communication method, and a non-transitory computer readable storage medium.

Description of the Related Art

There is known Hyper Text Transfer Protocol (to be referred to as HTTP hereinafter) as a protocol when performing communication between an information processing apparatus and a Web server or a peripheral apparatus having a Web server function. In general, HTTP is a protocol that is often used for communication via a network line but can also be used for communication via Universal Serial Bus (to be referred to as USB hereinafter). As a typical example, there is known a specification called Internet Printing Protocol (to be referred to as IPP hereinafter) over USB that transmits/receives, via USB, IPP obtained by extending HTTP. In communication between an information processing apparatus and an image processing apparatus using IPP over USB, there is also known a technique of managing communication between the image processing apparatus and a plurality of software programs operating on the information processing apparatus (see Japanese Patent Laid-Open No. 2014-089675).

However, in the above-described network environment, if the information processing apparatus (USB host or HTTP client) terminates processing without obtaining response information, the image processing apparatus (USB device or HTTP server) keeps holding the response information. As a result, when a request is received next from the information processing apparatus, inappropriate response information may be returned.

In addition, if there is processing that is established by transmitting/receiving pieces of information in a predetermined order, when the processing is terminated midway without performing communication by the information processing apparatus, the image processing apparatus may not be able to execute another processing.

Note that since USB communication has no concept like a TCP session, the USB device side cannot determine to abort processing.

SUMMARY OF THE INVENTION

Accordingly, the present invention is conceived as a response to the above-described disadvantages of the conventional art.

For example, a communication apparatus, a communication method, and a non-transitory computer readable storage medium according to this invention are capable of terminating processing of an apparatus as a communication partner even if communication from the apparatus is terminated midway.

According to one aspect of the present invention, there is provided a communication apparatus that performs communication by establishing communication with a communication partner apparatus, comprising: a transmission unit configured to transmit request information for requesting information pertaining to the communication partner apparatus, wherein the request information includes first information for identifying communication with the communication partner apparatus, and the communication partner apparatus transmits response information corresponding to the request information; a determination unit configured to determine, by receiving the response information from the communication partner apparatus, whether second information included in the response information matches the first information; and an instruction unit configured to transmit, if the first information and the second information do not match each other, to the communication partner apparatus, an instruction to operate the communication partner apparatus in a status in which it is possible to transmit the response information corresponding to the request information.

According to another aspect of the present invention, there is provided a non-transitory computer readable storage medium which stores a computer program to be executed in a processor of a communication apparatus that performs communication by establishing communication with a communication partner apparatus, the program comprising: transmitting request information for requesting information pertaining to the communication partner apparatus, wherein the request information includes first information for identifying communication with the communication partner apparatus, and the communication partner apparatus transmits response information corresponding to the request information; determining, by receiving the response information from the communication partner apparatus, whether second information included in the response information matches the first information; and transmitting, if the first information and the second information do not match each other, to the communication partner apparatus, an instruction to operate the communication partner apparatus in a status in which it is possible to transmit the response information corresponding to the request information.

According to still another aspect of the present invention, there is provided a communication method for a communication apparatus that performs communication by establishing communication with a communication partner apparatus, comprising: transmitting request information for requesting information pertaining to the communication partner apparatus, wherein the request information includes first information for identifying communication with the communication partner apparatus, and the communication partner apparatus transmits response information corresponding to the request information; determining, by receiving the response information from the communication partner apparatus, whether second information included in the response information matches the first information; and transmitting, if the first information and the second information do not match each other, to the communication partner apparatus, an instruction to operate the communication partner apparatus in a status in which it is possible to transmit the response information corresponding to the request information.

The invention is particularly advantageous since it is possible to cause a communication partner apparatus to execute appropriate processing even if communication is terminated midway.

Further features of the present invention will become apparent from the following description of exemplary embodiments (with reference to the attached drawings).

DESCRIPTION OF THE EMBODIMENTS

Exemplary embodiments of the present invention will now be described in detail in accordance with the accompanying drawings.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium (or sheet)" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be broadly interpreted to be similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

<Overview of Print System (FIGS. 1 to 3)>

Figure 1:
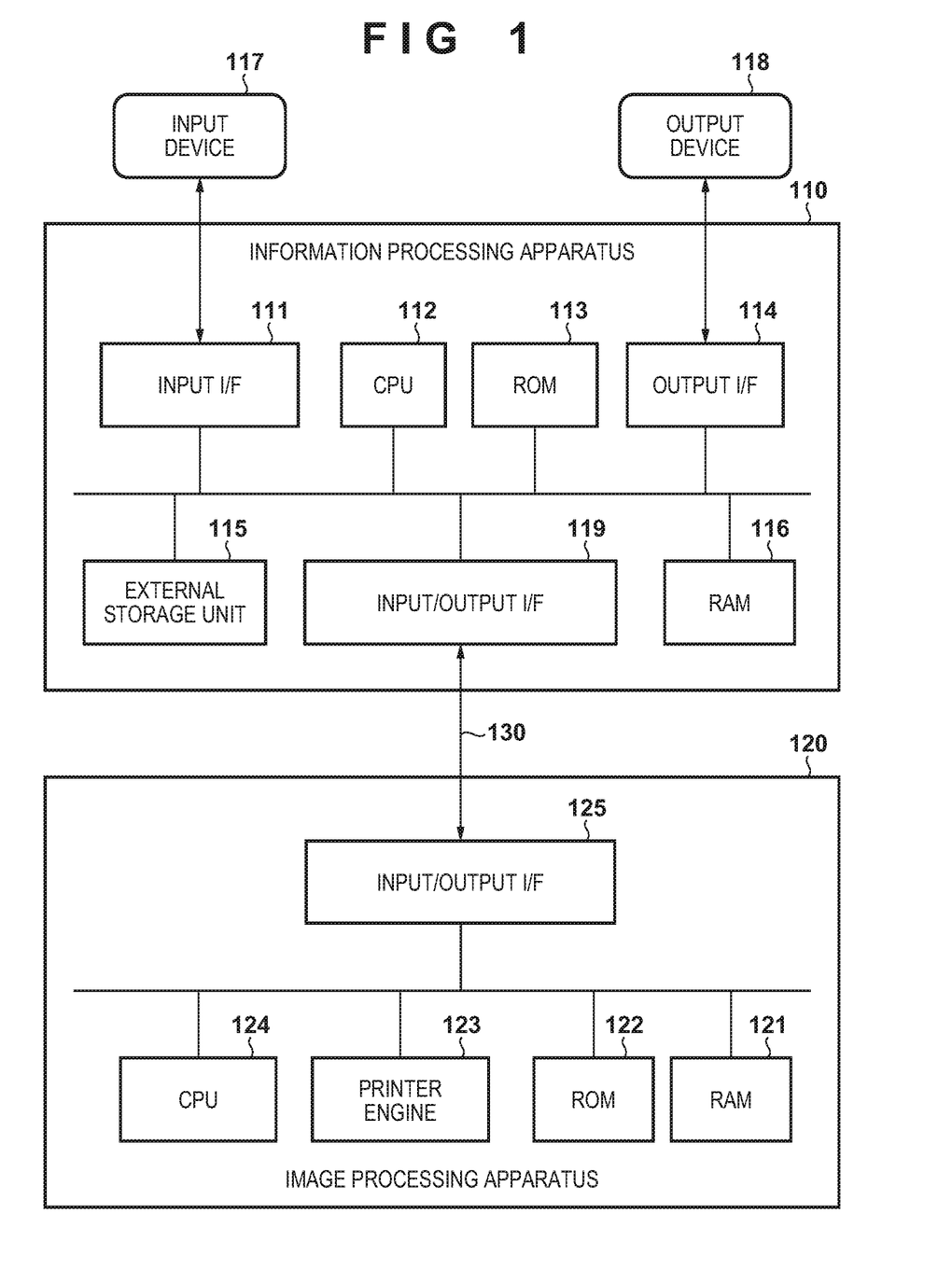
FIG. 1 is a block diagram showing a print system.

FIG. 1 is a block diagram showing an overview of the overall arrangement of a print system formed by an information processing apparatus and an image processing apparatus.

As shown in FIG. 1, this print system is formed from an information processing apparatus 110 and an image processing apparatus 120 connected to the information processing apparatus 110 by USB. The information processing apparatus 110 is connected to an input device 117 such as a pointing device used for data input or an operation instruction, and an output device 118 such as an LCD display used for data display or status notification. More specifically, the information processing apparatus 110 is connected to the input device 117 via an input interface (I/F) 111 and to the output device 118 via an output interface (I/F) 114. Specific examples of the information processing apparatus are a personal computer (PC), tablet terminal, smartphone, and digital camera, each of which includes a USB interface.

In addition to the input I/F 111 and the output I/F 114, the information processing apparatus 110 includes a CPU 112, a ROM 113, an external storage unit 115, a RAM 116, and an input/output interface (I/F) 119. The ROM 113 stores an initialization program, and the external storage unit 115 such as a hard disk (HD) or a solid state disk (SSD) stores an OS, applications, and various kinds of data. The RAM 116 is used as a work area by the CPU 112 to execute various programs stored in the external storage unit 115.

The image processing apparatus 120 is formed from a RAM 121, a ROM 122 that stores a control program, a printer engine 123, a CPU 124 that executes control of the overall apparatus, communication control, and print control by executing the control program, and an input/output interface (I/F) 125. The information processing apparatus 110 and the image processing apparatus 120 are connected via the input/output I/Fs 119 and 125 by a USB cable 130. The RAM 121 is used as a work area when the CPU 124 executes the control program and is also used as a buffer for temporarily saving data received from the information processing apparatus 110.

The printer engine 123 executes printing on a print medium based on image data saved in the RAM 121. The printer engine 123 may adopt an electrophotographic method or an inkjet method. Practical examples of the image processing apparatus are a single function printer, and a multi-function printer (MFP) including a scanner apparatus and a facsimile device.

Note that the above-described processing sharing between the information processing apparatus 110 and the image processing apparatus 120 is not limited to this, and another form of processing sharing may be employed.

As is apparent from the above arrangement, the print system shown in FIG. 1 is formed by the practical information processing apparatus and image processing apparatus. Since, however, the apparatuses are connected by USB and communicate with each other via USB interfaces, the apparatuses can be said to be communication apparatuses.

Figure 2:
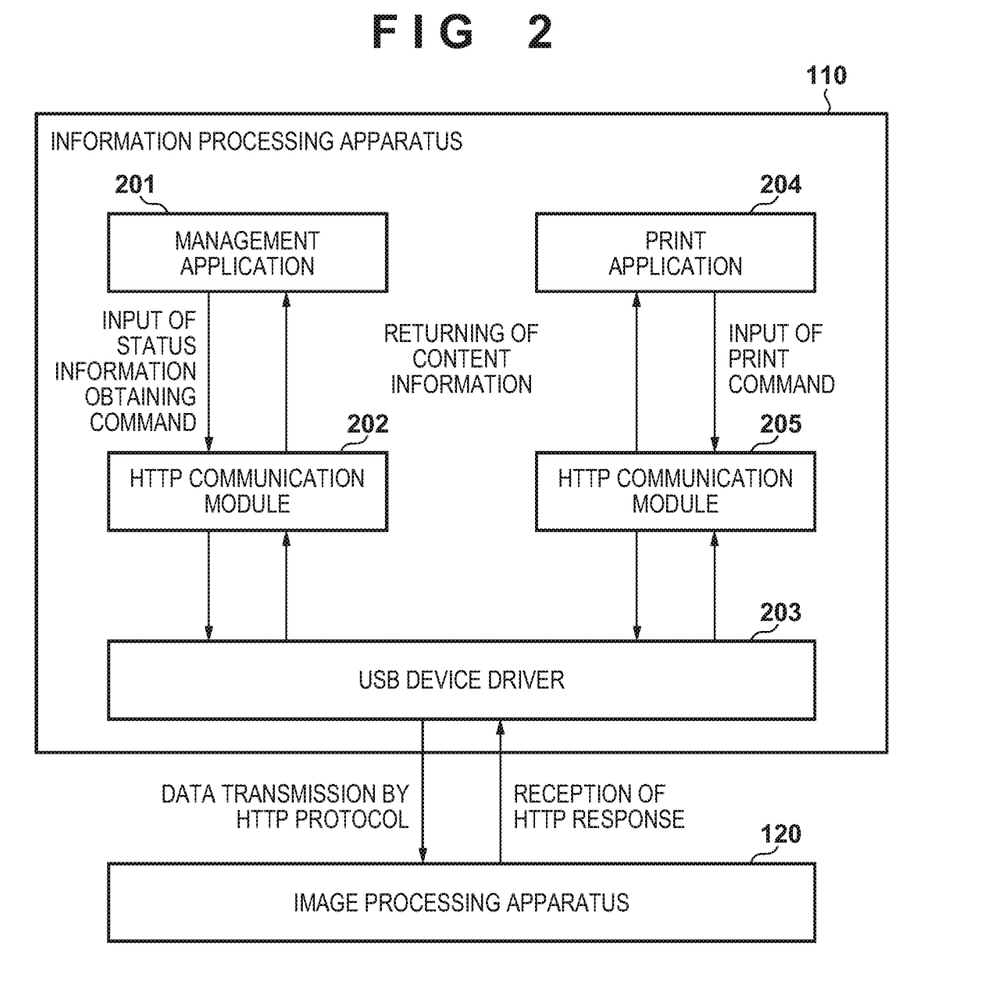
FIG. 2 is a block diagram showing an overview of a management application and a print application.

FIG. 2 is a block diagram showing software programs executed by the information processing apparatus.

The information processing apparatus 110 executes a management application 201 and a print application 204 that communicate with the image processing apparatus 120 via a USB device driver 203 and HTTP communication modules 202 and 205, respectively.

The management application 201 inputs, to the HTTP communication module 202, a command to request obtaining of status information of the image processing apparatus 120. The HTTP communication module 202 converts the received command into an HTTP request packet, and transmits it to the image processing apparatus 120 via the USB device driver 203. Upon receiving the HTTP request packet transmitted by the USB device driver 203, the image processing apparatus 120 generates, as an HTTP response packet, information indicating whether the reception processing has succeeded. The HTTP communication module 202 obtains the HTTP response packet via the USB device driver 203. After that, the HTTP communication module 202 extracts reception result information included in the HTTP response packet, and returns the reception result information to the management application 201.

Subsequently, the management application 201 inputs, to the HTTP communication module 202, a command to obtain status information of the image processing apparatus 120. The HTTP communication module 202 converts the received command into an HTTP request packet, and transmits it to the image processing apparatus 120 via the USB device driver 203. Upon receiving the HTTP request packet, the image processing apparatus 120 generates an HTTP response packet including status information of itself. The HTTP communication module 202 obtains the HTTP response packet via the USB device driver 203. After that, the HTTP communication module 202 returns, to the management application 201, the status information of the image processing apparatus 120 included in the HTTP response packet.

The print application 204 converts input data specified by the user into a print command interpretable by the image processing apparatus 120, and sequentially inputs the converted print command to the HTTP communication module 205. The HTTP communication module 205 converts the received print command into an HTTP request packet, and transmits it to the image processing apparatus 120. Upon receiving the HTTP request packet transmitted by the HTTP communication module 205, the image processing apparatus 120 generates, as an HTTP response packet, information indicating whether the reception processing has succeeded. The HTTP communication module 205 obtains the HTTP response packet via the USB device driver 203. After that, the HTTP communication module 205 extracts reception result information included in the HTTP response packet, and returns the reception result information to the print application 204.

As described above, the information processing apparatus 110 and the image processing apparatus 120 perform HTTP communication in a USB-connected form. The information processing apparatus 110 operates as an HTTP client, and the image processing apparatus 120 operates as an HTTP server. Therefore, the print system can be said to form a client-server system.

Note that in HTTP communication, a Web server or the image processing apparatus (HTTP server) that has received a request from the information processing apparatus (HTTP client) generates response information, and transmits it to the HTTP client. Even if transmission of the response information from the image processing apparatus is not completed, the image processing apparatus can perform processing of repeating transmission processing a plurality of times and then discarding the response information. In addition, since a session is distinguished based on the IP addresses and port numbers of the information processing apparatus and the image processing apparatus in the TCP layer, the image processing apparatus can return to an initial state by session closing upon termination of processing. For example, even if the information processing apparatus terminates the processing while transmission of the response information is incomplete, the response information is discarded.

On the other hand, when the information processing apparatus (USB host) and the image processing apparatus (USB device) that are connected by USB perform communication, the USB device side cannot actively transmit information to the USB host. Therefore, to perform communication via USB using an HTTP-based protocol, the information processing apparatus (HTTP client) needs to obtain response information generated by the image processing apparatus (HTTP server) after transmitting an HTTP request.

Figure 3:
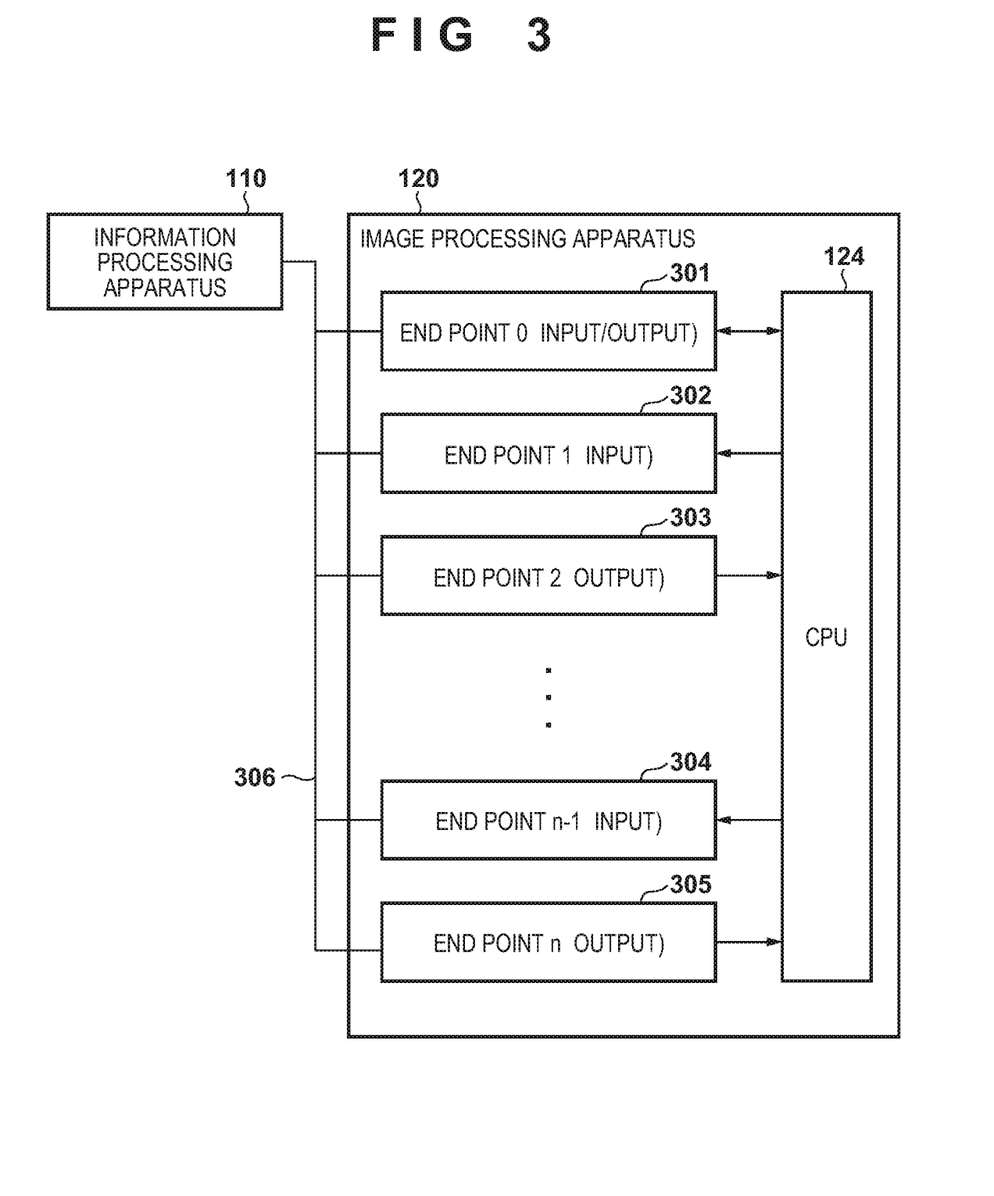
FIG. 3 is a conceptual view showing HTTP communication between an information processing apparatus and an image processing apparatus.

FIG. 3 is a block diagram for explaining communication between the information processing apparatus and the image processing apparatus using the USB device driver.

If the image processing apparatus 120 is connected to the information processing apparatus 110 by the USB cable 130, a logical communication path (pipe) is generated between the information processing apparatus 110 and an end point 0 (input/output) 301 on a USB bus 306, as shown in FIG. 3. After that, the information processing apparatus 110 acknowledges the image processing apparatus 120 via communication by control transfer. At this time, pipes are generated between the information processing apparatus 110 and end points (1 to n) 302 to 305 of the image processing apparatus 120. In this case, the information processing apparatus 110 operates as a USB host, and the image processing apparatus 120 as a communication partner apparatus operates as a USB device.

Note that communication using each of the pipes generated between the information processing apparatus 110 and the end points 302 to 305 except for the end point 0 (input/output) 301 is one-way communication in one of an "output" direction in which data is transferred from the information processing apparatus 110 and an "input" direction in which data is transferred from the image processing apparatus 120.

When transferring information from the image processing apparatus 120 to the information processing apparatus 110, the information processing apparatus 110 as a host controls the USB bus 306, and thus the image processing apparatus 120 cannot write the information in the USB bus 306. To cope with this, in transfer in the "input" direction from the image processing apparatus 120 to the information processing apparatus 110, the information is written in the "input" end point, and is held until the information processing apparatus 110 transmits the "input packet" to the end point.

Figure 4:
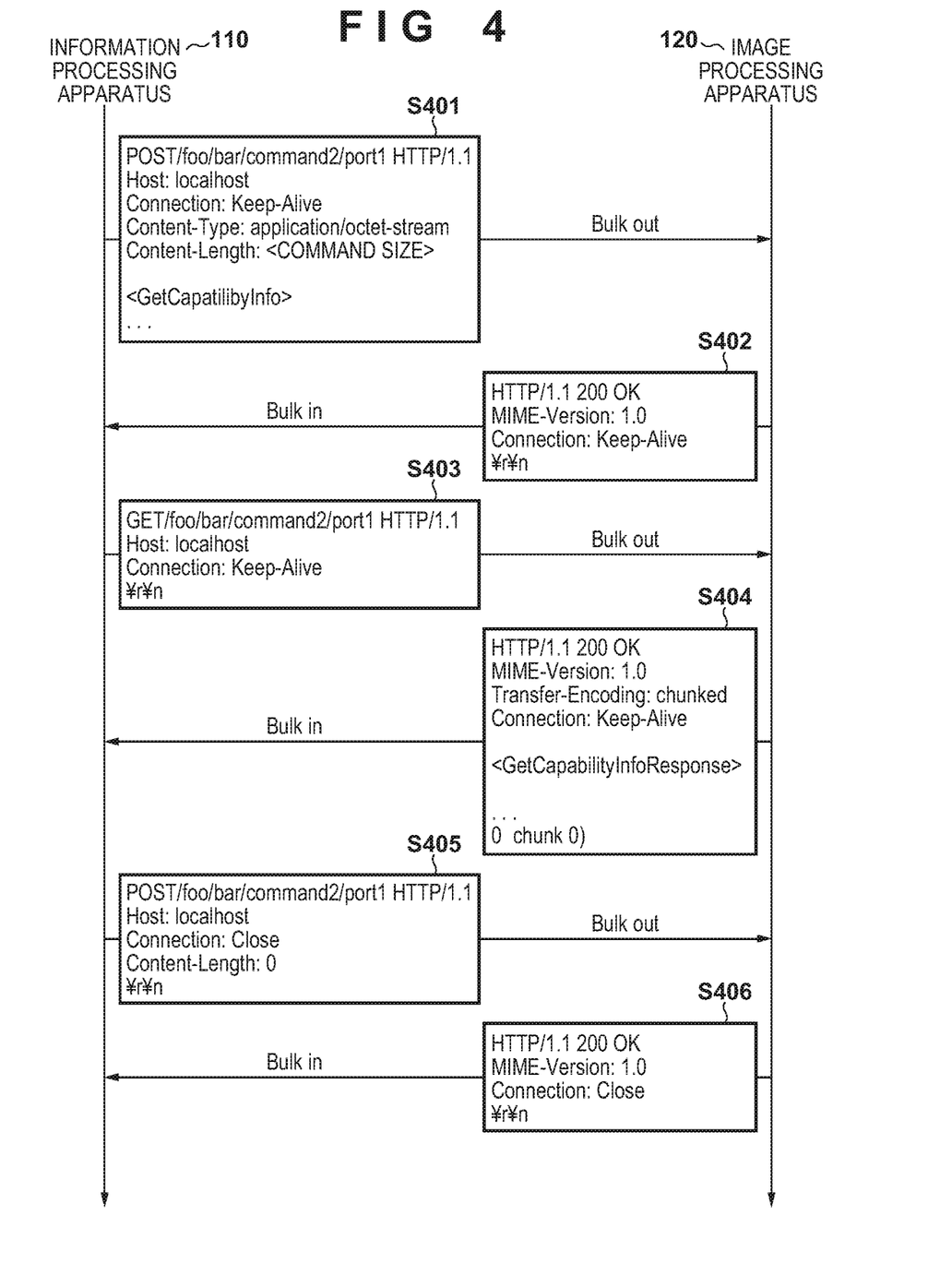
FIG. 4 is a sequence chart showing the sequence of HTTP packets transmitted/received between the information processing apparatus and the image processing apparatus.
Figure 5:
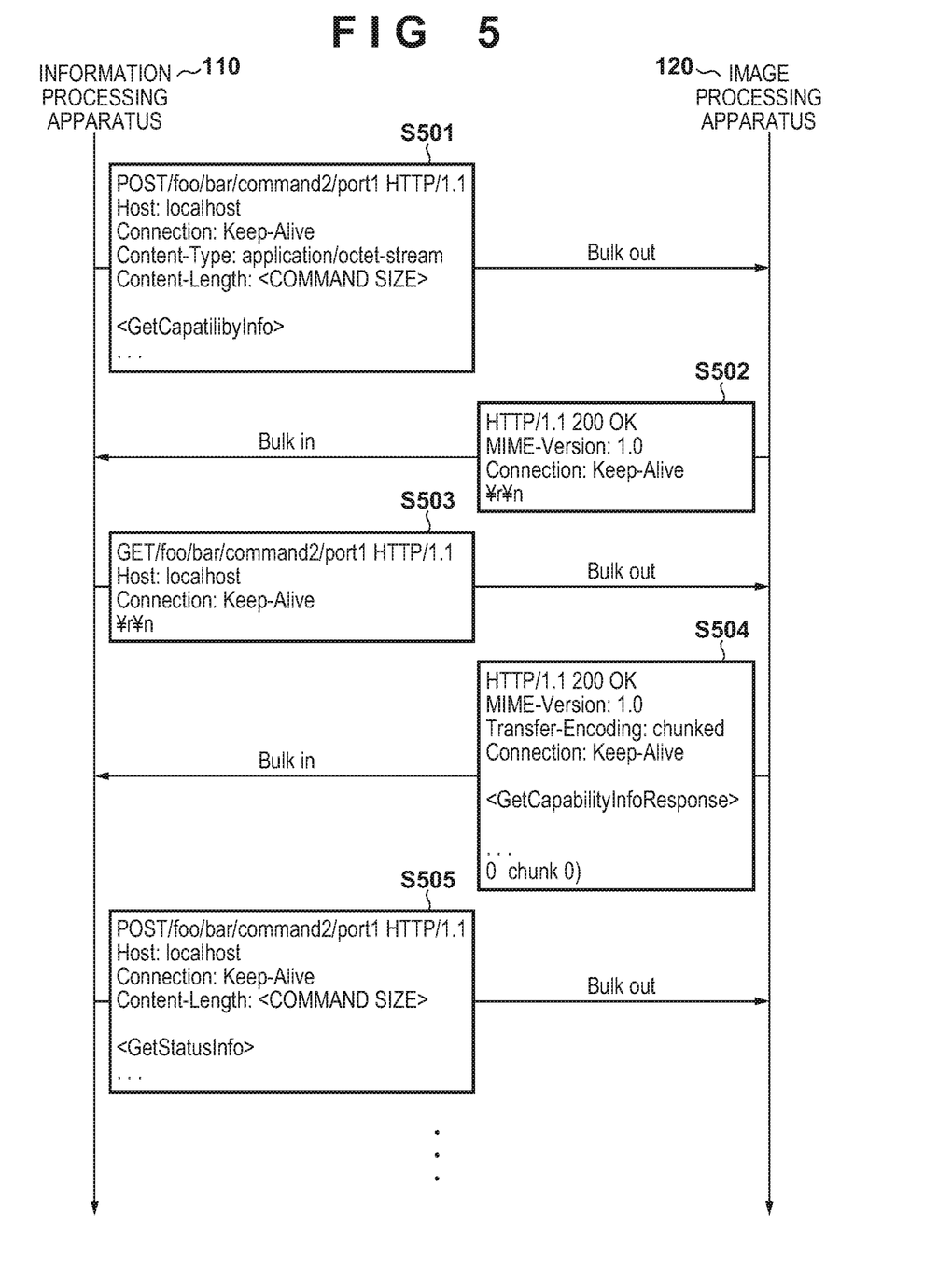
FIG. 5 is a sequence chart showing an example in which information, that is written in an end point by the image processing apparatus in response to a request from the information processing apparatus, remains without being obtained.

HTTP Packet Transmission/Reception Sequence (FIGS. 4 and 5)

(1) Normal Processing

FIG. 4 is a sequence chart showing a sequence when HTTP packets are normally transmitted/received between the information processing apparatus and the image processing apparatus. Note that the information processing apparatus 110 and the image processing apparatus 120 are connected by the USB cable 130, and the HTTP packets are exchanged on the USB bus 306.

The HTTP communication module 202 generates an HTTP request (HTTP request line, header, and body) in response to a capability information obtaining command (<GetCapabilityInfo>) input from the management application 201. The HTTP communication module 202 transmits the generated HTTP request (S401) to the image processing apparatus 120 via the USB device driver 203. Note that if the HTTP request cannot be transmitted completely by one communication operation, the HTTP request is transmitted in several parts. Bulk transfer is used in a USB transfer mode (Bulk out/Bulk in). Upon receiving the HTTP request, the image processing apparatus 120 generates, as an HTTP response (S402), information including a status code (200) indicating success of reception, and writes it in the end point (input).

The HTTP communication module 202 obtains the HTTP response (S402) via the USB device driver 203. Subsequently, the HTTP communication module 202 transmits, to the image processing apparatus 120, an HTTP request (S403) to obtain a response to the capability information obtaining command included in the HTTP request (S401) transmitted to the image processing apparatus 120. In response to this, the image processing apparatus 120 generates an HTTP response (S404) including a status code (200) indicating success of reception of the HTTP request and a command (<GetCapabilityInfoResponse>) to return capability information. Then, the image processing apparatus 120 writes the HTTP response in the end point (input). The HTTP communication module 202 obtains the HTTP response (S404) via the USB device driver 203, extracts the capability information, and transmits it to the management application 201.

After that, the HTTP communication module 202 transmits, to the image processing apparatus 120, an HTTP request (S405) indicating termination of communication. Upon receiving the request, the image processing apparatus 120 generates an HTTP response (S406) indicating success of reception of the request, and writes the HTTP response in the end point (input). Lastly, when the HTTP communication module 202 obtains the HTTP response (S406), the series of communication operations is terminated.

(2) Midway Termination

FIG. 5 is a sequence chart showing a sequence example when processing of the management application or the HTTP communication module is terminated midway for some reason and information written in the end point (input) by the image processing apparatus remains without being obtained. The reason why the processing is terminated midway is a defect of the processing (non-execution of response information obtaining processing) of the management application or the HTTP communication module, or forced termination of the management application or the HTTP communication module caused by access violation or the like.

Note that in FIG. 5, HTTP requests and HTTP responses (S501 to S504) correspond to the HTTP requests and HTTP responses (S401 to S404) in FIG. 4, and a description thereof will be omitted.

Referring to FIG. 5, the HTTP communication module 202 generates an HTTP request (S505) corresponding to a status information obtaining command (<GetStatusInfo>) input from the management application 201. The HTTP communication module 202 transmits the HTTP request to the image processing apparatus 120 via the USB device driver 203.

Upon receiving the HTTP request, the image processing apparatus 120 generates an HTTP response including a status code (200) indicating success of reception of the HTTP request and a command (<GetStatusInfoResponse>) to return status information. The image processing apparatus 120 writes the HTTP response in the end point (input).

As shown in FIG. 5, if the management application 201 or the HTTP communication module 202 performs no processing of obtaining the information, the HTTP response information written in the end point (input) remains without being obtained. As a result, for example, if the print application 204 attempts to obtain the information in the end point (input) later, HTTP response information that is different from expected one may be returned.

As is apparent from the above description, if the information processing apparatus and the image processing apparatus perform HTTP communication in an environment in which they are connected by USB, the information processing apparatus operates as a USB host or HTTP client and the image processing apparatus operates as a USB device or an HTTP server.

Some embodiments of a handling method when HTTP communication shown in FIG. 5 is terminated midway in the print system with the above-described arrangement will be described next.

Figure 6:
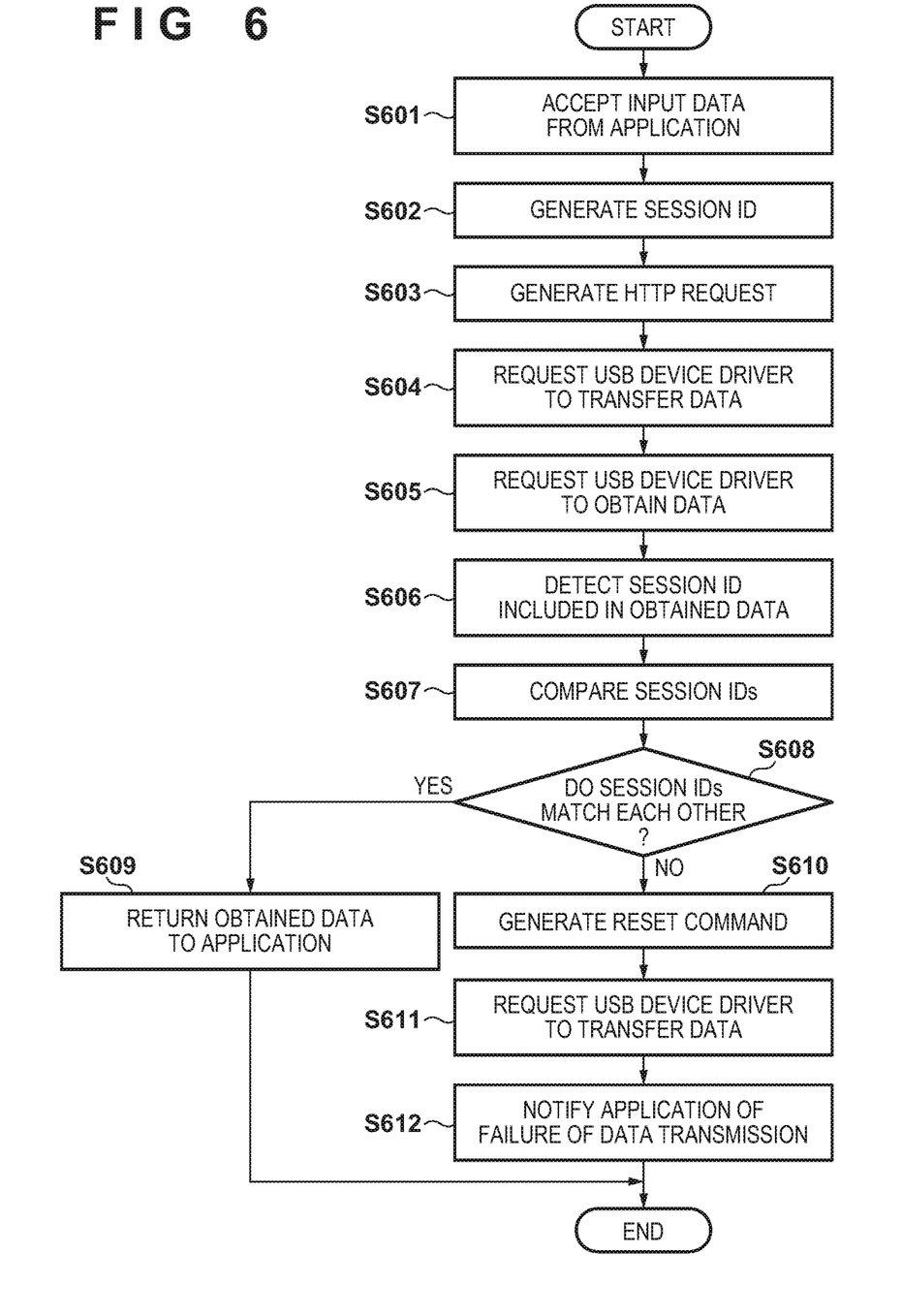
FIG. 6 is a flowchart illustrating data transmission/reception processing of an HTTP communication module.
Figure 7:
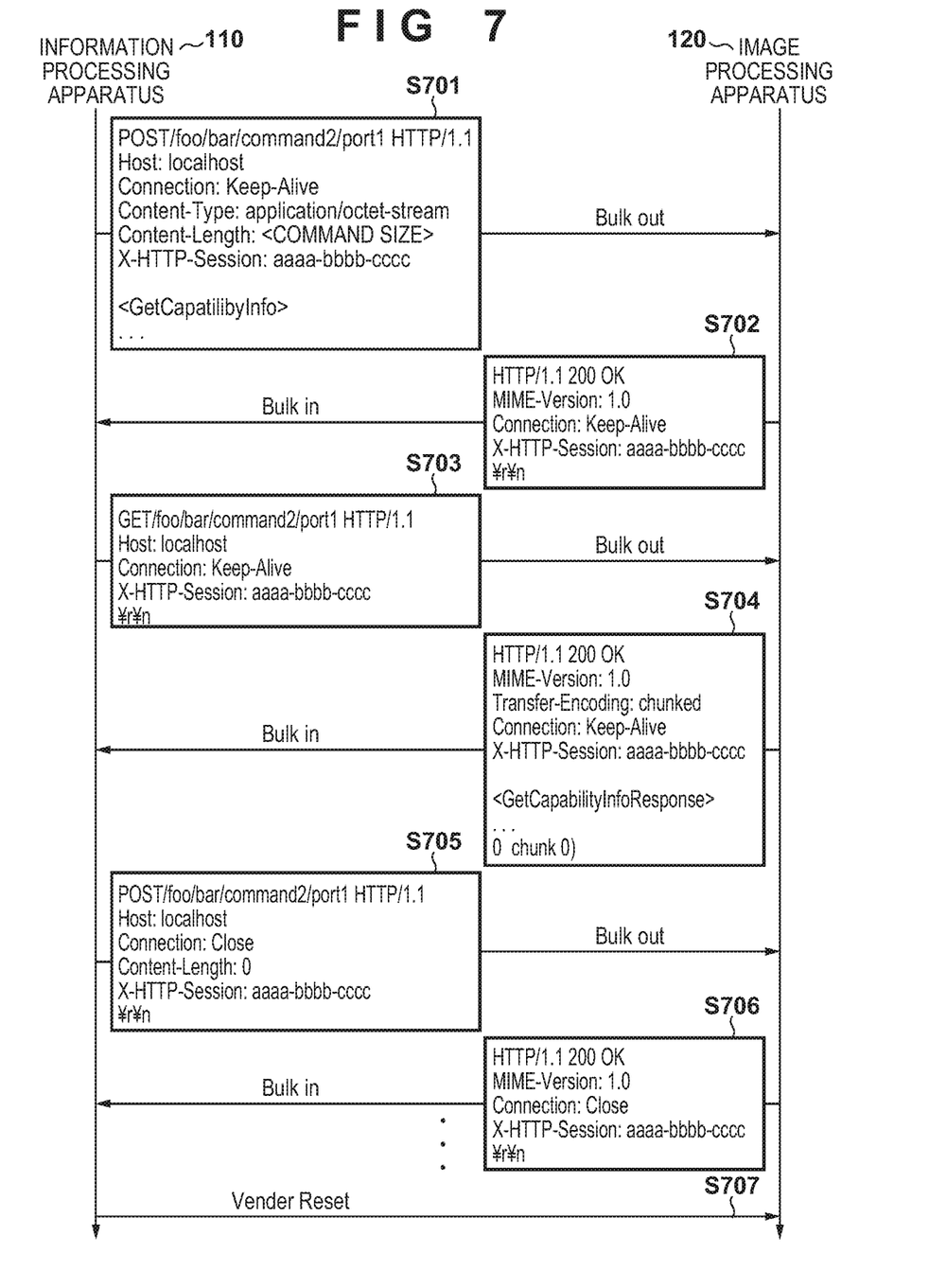
FIG. 7 is a sequence chart showing an example of an HTTP packet transmission/reception sequence.

First Embodiment (FIGS. 6 and 7)

FIG. 6 is a flowchart illustrating communication control processing in an HTTP communication module.

FIG. 7 is a sequence chart showing a communication sequence between an information processing apparatus 110 and an image processing apparatus 120 when performing the processing to be described with reference to FIG. 6.

Referring to FIG. 6, when an HTTP communication module 202 starts the communication control processing, the HTTP communication module 202 receives, in step S601, an information obtaining command input from a management application 201. Subsequently, in step S602, the HTTP communication module 202 generates information (to be referred to as a session ID hereinafter) for uniquely specifying communication with the image processing apparatus 120. There is known a method that uses a GUID (Global Unique Identifier) as unique information.

In step S603, the HTTP communication module 202 generates HTTP request information including the information obtaining command accepted in step S601 and the session ID generated in step S602. Furthermore, in step S604, the HTTP communication module 202 transmits the HTTP request information to the image processing apparatus 120 via a USB device driver 203. Note that an HTTP extension header (X-HTTP-Session) is defined to exchange the session ID (S701 of FIG. 7).

Subsequently, in step S605, the HTTP communication module 202 obtains response information from the image processing apparatus 120 via the USB device driver 203. Assume that, at this time, the image processing apparatus 120 responds by identifying the session ID included in the HTTP request received from the information processing apparatus 110 and embedding the session ID in HTTP response information (S702 of FIG. 7). Note that if an HTTP response in an unobtained status remains in the image processing apparatus 120, the image processing apparatus 120 responds to the information processing apparatus 110 with an HTTP response including the session ID of the HTTP response remaining in the unobtained status. Note that in subsequent communication between the information processing apparatus 110 and the image processing apparatus 120, the session ID is exchanged using the HTTP extension header (X-HTTP-Session) (S703 to S706 of FIG. 7).

After that, in step S606, the HTTP communication module 202 detects the session ID included in the obtained HTTP response information, and compares the detected session ID with the session ID generated in step S604 (step S607).

In step S608, based on the comparison in step S607, the HTTP communication module 202 checks whether the session IDs match each other. If it is determined that the session IDs match each other, the process advances to step S609. In step S609, the HTTP communication module 202 responds to the management application 201 with the response information obtained from the image processing apparatus 120 in step S605, and then terminates the processing. On the other hand, if it is determined that the session IDs do not match each other, the processing in the HTTP communication module 202 advances to step S610.

In step S610, the HTTP communication module 202 generates a reset command to set the status of the image processing apparatus 120 to the initial state, and transmits the reset command to the image processing apparatus 120 via the USB device driver 203. The HTTP communication module 202 defines Vender Request as the reset command, and transmits it to the image processing apparatus 120 using USB control transfer different from bulk transfer (Bulk) for data transmission/reception (S707 of FIG. 7). On the other hand, upon receiving the reset command, the image processing apparatus 120 discards the held response information to return to the initial state. After that, in step S612, the HTTP communication module 202 notifies the management application 201 of a failure of communication, thereby terminating the processing.

An example will now be exemplified. When the application causes the image processing apparatus to execute predetermined processing, the HTTP communication module 202 accepts input data from the application, and generates an HTTP request with a session ID=2. To cause the image processing apparatus to execute the predetermined processing, the HTTP communication module 202 transmits the HTTP request including the session ID=2 to the image processing apparatus 120.

On the other hand, the image processing apparatus 120 receives the HTTP request with the session ID=2 in a status in which an HTTP response with a session ID=1 in an unobtained status is held. In this case, the image processing apparatus 120 transmits the HTTP response with the session ID=1 that is held at the top. Note that the status in which the HTTP response with the session ID=1 in the unobtained status is held corresponds to a status in which the image processing apparatus 120 cannot execute the above-described predetermined processing.

As a result, the HTTP communication module 202 determines that the session ID=2 generated in step S602 is different from the ID of the HTTP response with the session ID=1 detected in step S606 (step S608), and executes step S611. In step S611, the image processing apparatus 120 is returned to the initial state. The reason why the image processing apparatus 120 is returned to the initial state will now be described. For example, when the image processing apparatus 120 executes processing by transmitting/receiving pieces of information in a predetermined order, if the information processing apparatus terminates the processing midway without performing communication, the image processing apparatus may not be able to execute another processing (the above-described predetermined processing). By returning the status of the image processing apparatus 120 to the initial state in step S611, the image processing apparatus 120 can execute the predetermined processing based on the HTTP request with the session ID=2. Therefore, the above-described reset command can be referred to as an instruction to operate the image processing apparatus 120 in a status in which it is possible to execute newly requested predetermined processing. Note that the initial state is merely an example, and any status in which the above-described predetermined processing is executable is possible. The predetermined processing is, for example, print processing or processing in which the image processing apparatus 120 transmits capability information of itself in response to a request, but may be another processing.

Therefore, according to the above-described embodiment, in the environment in which the information processing apparatus and the image processing apparatus are connected by USB, even if HTTP communication from the information processing apparatus is terminated midway, the processing on the image processing apparatus side can be terminated.

Note that if the management application 201 receives a failure of communication from the HTTP communication module 202, data may be transmitted/received again. In this case, since the image processing apparatus 120 returns to the initial state by the processes in steps S610 and S611, success of communication is expected.

This embodiment has explained an example in which a session ID is generated every time the information processing apparatus 110 and the image processing apparatus 120 perform communication. However, communication between the application and the image processing apparatus 120 may be set as a unit, and the same session ID may be used in the communication.

Furthermore, if it is determined in step S608 that the session IDs do not match each other, the processes in steps S605 to S608 may be repeated until it is determined that the session IDs match each other. In this case, the number of times the processes are repeated may be determined in advance. If, during that time, it is not determined that the session IDs match each other, the process may advance to step S610.

An example will be exemplified. The HTTP communication module 202 accepts input data from the application, generates an HTTP request with a session ID=2, and transmits it to the image processing apparatus 120.

On the other hand, the image processing apparatus 120 receives the HTTP request with the session ID=2 in a status in which an HTTP response with a session ID=1 in an unobtained status is held. In this case, the image processing apparatus 120 holds the HTTP response with the session ID=1 and that with the session ID=2. The image processing apparatus transmits the HTTP response with the session ID=1 held at the top.

As a result, the HTTP communication module 202 determines that the session ID=2 generated in step S602 is different from the ID of the HTTP response with the session ID=1 detected in step S606 (step S608). The HTTP communication module 202 receives the HTTP response with the session ID=2 from the image processing apparatus by executing steps S605 to S607 again.

As a result, when steps S605 to S608 are executed for the second time, the HTTP communication module 202 can receive an HTTP response with a session ID matching the session ID=2 generated in step S602.

Figure 8:
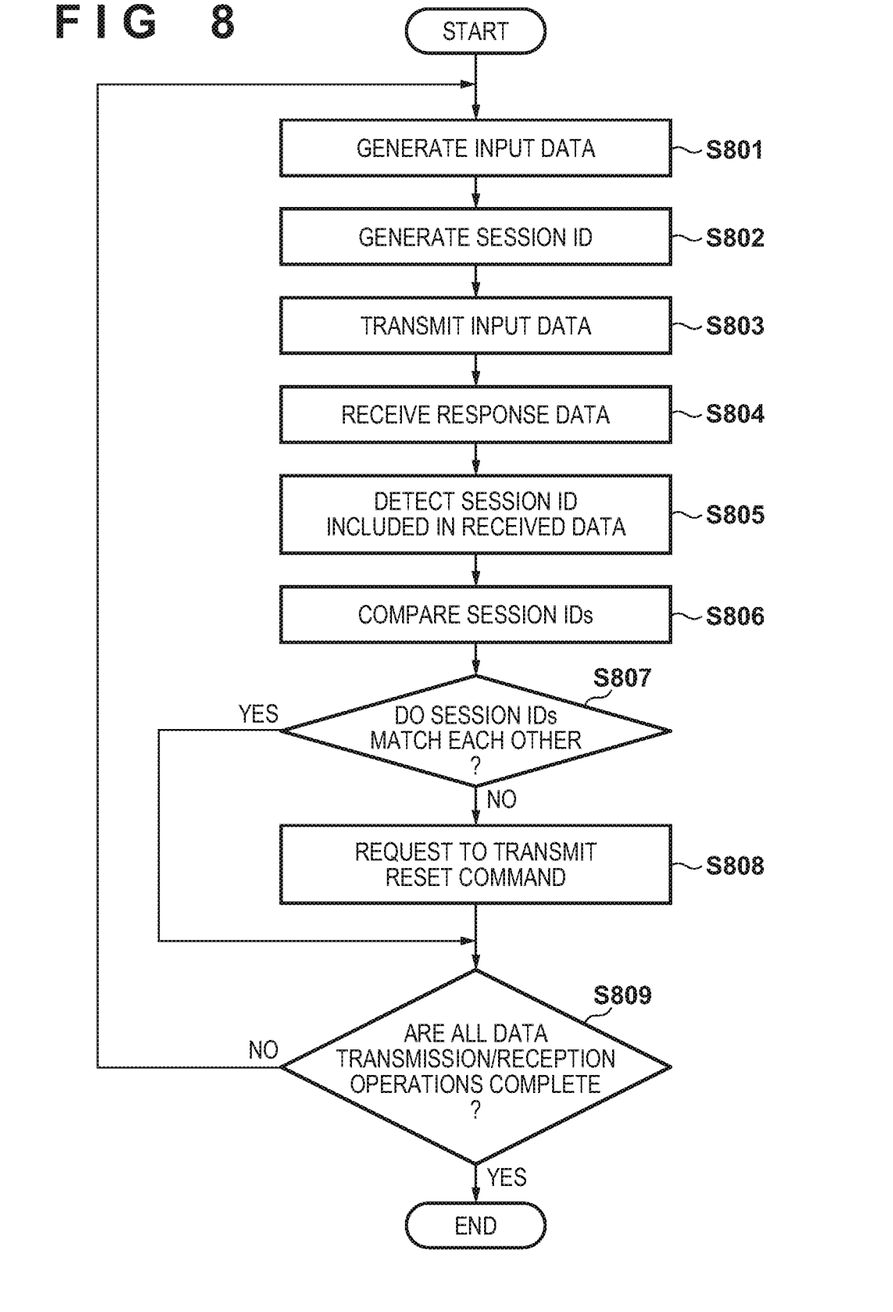
FIG. 8 is a flowchart illustrating processing of a management application.
Figure 9:
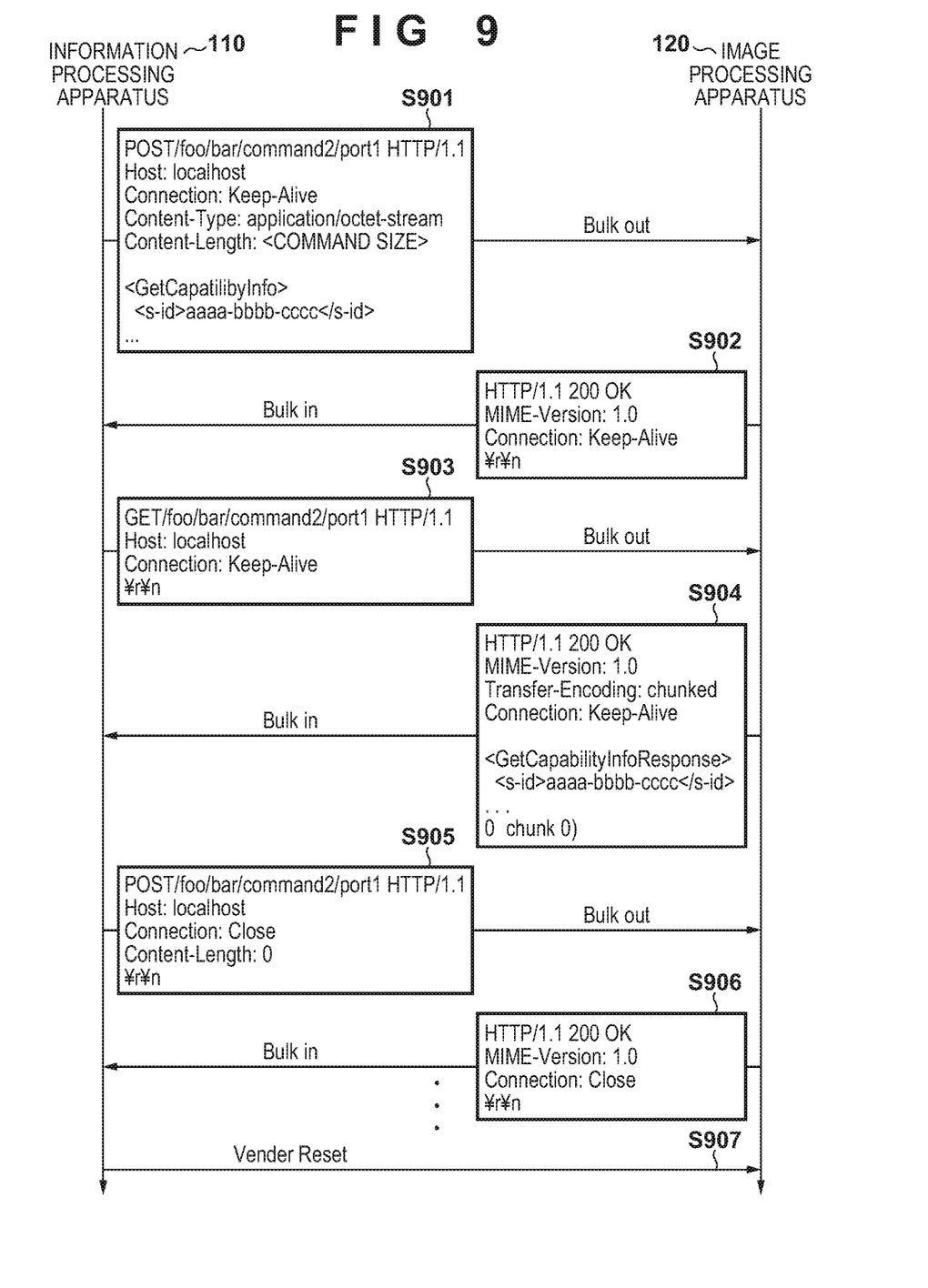
FIG. 9 is a sequence chart showing an example of an HTTP packet transmission/reception sequence.

Second Embodiment (FIGS. 8 and 9)

The first embodiment has explained the example in which the HTTP communication module 202 generates a session ID and transmits, to the image processing apparatus, an HTTP request including an extension header set with that information. This embodiment will describe an example in which an application manages a session ID.

FIG. 8 is a flowchart illustrating communication control processing in which the application manages a session ID. FIG. 9 is a sequence chart showing a communication sequence between an information processing apparatus 110 and an image processing apparatus 120 when performing the processing to be described with reference to FIG. 8. Note that communication between a management application 201 and the image processing apparatus 120 will be exemplified.

When communication control processing starts, the management application 201 generates, in step S801, input data to be transmitted to the image processing apparatus 120. In step S802, the management application 201 generates information (to be referred to as a session ID hereinafter) for uniquely specifying communication with the image processing apparatus 120. Note that the processes in steps S801 and S802 may be reversed.

Next, in step S803, the management application 201 transmits the input data generated in step S801 and the session ID generated in step S802 to the image processing apparatus 120 via an HTTP communication module 202. In this example, a parameter (<s-id>) indicating a session ID is prepared in a capability information obtaining command (<GetCapabilityInfo>), and the session ID generated in step S802 is set in the parameter (S901 of FIG. 9).

Furthermore, in step S804, the management application 201 receives, via the HTTP communication module 202, response information returned from the image processing apparatus 120. Note that the image processing apparatus 120 identifies the session ID included in the capability information obtaining command received from the information processing apparatus 110. The image processing apparatus 120 responds by embedding the identified session ID in the capability information return command (<GetCapabilityInfoResponse>) (S904 of FIG. 9). Note that S902 and S903 of FIG. 9 correspond to S402 and S403 of FIG. 4, respectively, and a description thereof will be omitted.

After that, in step S805, the management application 201 detects the session ID included in the obtained response information, and compares the detected session ID with the session ID generated in step S802 (step S806). In step S807, based on the comparison, the management application 201 checks whether the session IDs match each other. If it is determined that the session IDs match each other, the process advances to step S809. On the other hand, if it is determined that the session IDs do not match each other, the process advances to step S808. In step S808, the management application 201 generates a reset command for setting the status of the image processing apparatus 120 to the initial state, and transmits it to the image processing apparatus 120 via the HTTP communication module 202 (S907 of FIG. 9). Note that S905 and S906 of FIG. 9 correspond to S405 and S406 of FIG. 4, respectively, and a description thereof will be omitted.

Note that if it is determined in step S807 that the session IDs do not match each other, the processes in steps S804 to S807 may be repeated until it is determined that the session IDs match each other. In this case, the number of times the processes are repeated may be determined in advance. If, during that time, it is not determined that the session IDs match each other, the process may advance to step S808.

After that, in step S809, the management application 201 checks whether all scheduled data transmission/reception operations are complete. If it is determined that not all the data transmission/reception operations are complete, the process returns to step S801 and the above-described data transmission/reception processing is repeated. Note that in this case, if a session ID has already been generated, the generated session ID may be used without executing the processing in step S802. On the other hand, if it is determined that all the scheduled data transmission/reception operations are complete, the process is terminated.

Therefore, according to the above-described embodiment, in the environment in which the information processing apparatus and the image processing apparatus are connected by USB, even if HTTP communication from the information processing apparatus is terminated midway, the processing on the image processing apparatus side can be terminated.

Figure 10:
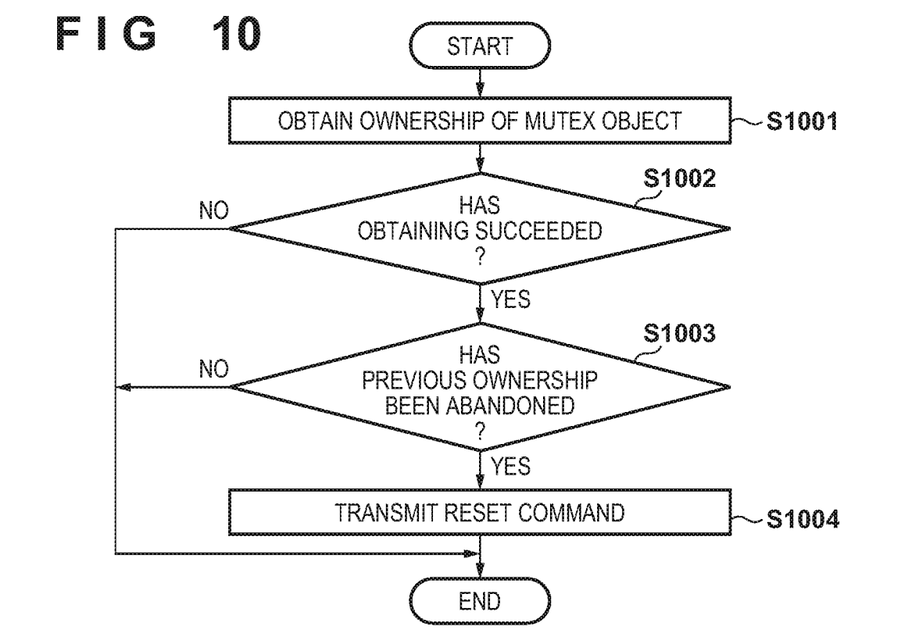
FIG. 10 is a flowchart illustrating ownership release processing.

Third Embodiment (FIG. 10)

In general, when there are a plurality of applications operating on an information processing apparatus 110 and each application needs to occupy communication with an image processing apparatus 120, a method of excluding processing between the applications using a scheme such as mutex or semaphore is plausible.

This embodiment will describe an example in which before an application executed by the information processing apparatus communicates with the image processing apparatus, the ownership of the image processing apparatus by another application is released using mutex as the exclusion method. More particularly, this embodiment assumes that in an environment in which a management application 201 and a print application 204 operate on the same information processing apparatus 110, the management application 201 exclusively occupies the image processing apparatus 120 to perform communication a plurality of times successively. In this case, a mutex object name shared between the management application 201 and the print application 204 is determined first.

Before executing the processing described with reference to FIG. 6 or 8 in the first or second embodiment, the management application 201 attempts to obtain the ownership of the mutex object. If the ownership is successfully obtained, the processing described with reference to FIG. 6 or 8 is executed.

Note that if the print application 204 communicates with the image processing apparatus 120, communication is performed similarly after obtaining the ownership of the mutex object. Since the print application 204 cannot obtain the ownership of the mutex object while the management application 201 owns the mutex object, no communication between the print application 204 and the image processing apparatus 120 is performed. That is, the management application 201 can exclusively occupy communication with the image processing apparatus 120.

After all the desired processes finish, the management application 201 releases the ownership of the mutex object. This allows the print application 204 to obtain the ownership of the mutex object, and to communicate with the image processing apparatus 120. Note that if the application terminates the processing without releasing the ownership of the mutex object, it is generally considered that the ownership has been abandoned. In this case, after that, the application that obtains the ownership of the mutex object determines whether the mutex object has been abandoned.

Note that as a case in which the ownership of the mutex object is abandoned, there may be a case in which there is a defect (the ownership is not released) of the processing in the application and a case in which the application is forcibly terminated due to access violation or the like. In this situation, the image processing apparatus 120 cannot complete the processing, which may hinder subsequent communication with another application.

FIG. 10 is a flowchart illustrating ownership release processing for communication recovery.

An example will be described, in which after the management application 201 terminates processing without releasing the ownership of the mutex object, the print application 204 communicates with the image processing apparatus 120.

When processing for occupying communication with the image processing apparatus 120 starts, the print application 204 attempts, in step S1001, to obtain the ownership of the mutex object shared with the management application 201.

In step S1002, the print application 204 checks whether obtaining of the ownership of the mutex object has succeeded. If it is determined that obtaining of the ownership has failed, the process is terminated. In this case, the print application 204 may attempt to obtain the ownership of the mutex object again. On the other hand, if it is determined that obtaining of the ownership of the mutex object has succeeded, the process advances to step S1003, and the print application 204 checks whether the ownership of the mutex object has been abandoned. More specifically, the print application 204 determines whether the ownership has been abandoned by determining whether information indicating that the ownership has been abandoned is included in the mutex object.

If it is determined that the ownership of the mutex object has been abandoned, the print application 204 generates a command for setting the status of the image processing apparatus 120 to the initial state, and transmits it to the image processing apparatus 120 (step S1004). With this operation, even if the management application 201 terminates the processing without releasing the ownership of the mutex object, and the processing of the image processing apparatus 120 is incomplete, it is possible to return the status of the image processing apparatus 120 to the initial state. After that, the print application 204 terminates the processing. In fact, the processing described with reference to FIG. 6 (or FIG. 8) is executed after FIG. 10, thereby performing communication with the image processing apparatus 120.

On the other hand, if, after the ownership of the mutex object is successfully obtained, it is determined that the ownership of the mutex object has not been abandoned, the process is terminated without any further process.

Therefore, according to the above-described embodiment, after another application releases the ownership of the occupied image processing apparatus, communication control according to the first or second embodiment can be executed to execute communication with the image processing apparatus.

Note that if the ownership cannot be obtained, the reason for this may be confirmed and it may be determined whether the previous ownership has been abandoned.

Furthermore, this embodiment has explained the example in which the application obtains the ownership of the mutex object to exclude communication between the plurality of applications and the image processing apparatus. However, the HTTP communication module may perform the same processing to exclude communication.

Figure 11:
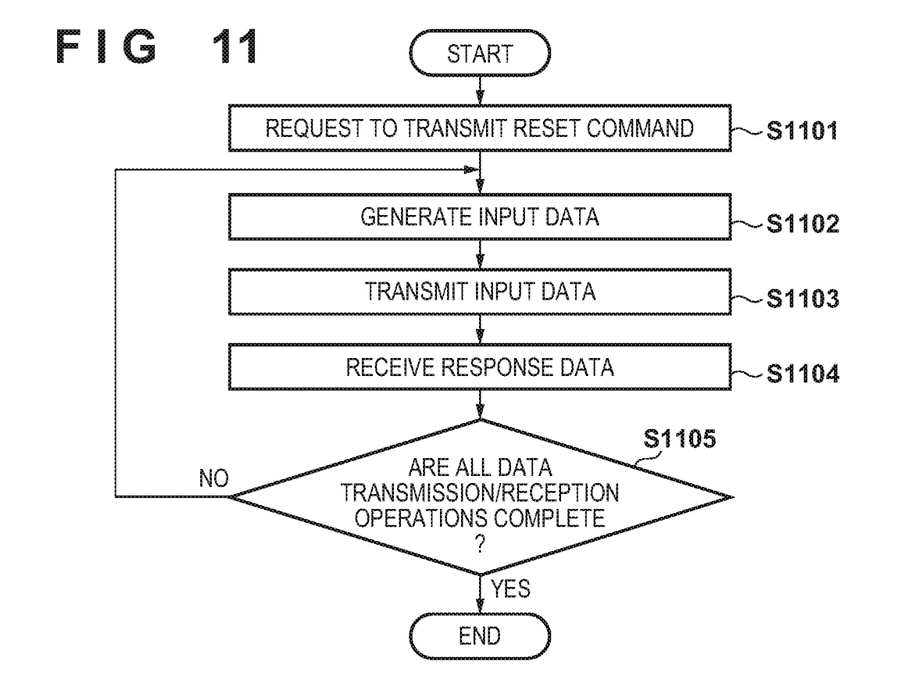
FIG. 11 is a flowchart illustrating processing of an application.

Fourth Embodiment (FIG. 11)

The first to third embodiments have explained the method in which the application operating on the information processing apparatus detects or predicts that processing with the application which previously communicated with the image processing apparatus is incomplete, and terminates the processing of the image processing apparatus. This embodiment will describe an example of terminating processing of an image processing apparatus without performing such detection or prediction processing.

FIG. 11 is a flowchart illustrating processing of an application operating on an information processing apparatus. Communication between a management application 201 and an image processing apparatus 120 will be exemplified.

When processing starts, in step S1101 the management application 201 generates a reset command to set the status of the image processing apparatus 120 to the initial state, and transmits the reset command to the image processing apparatus 120 via an HTTP communication module 202. This can terminate the processing of the image processing apparatus 120 even if processing with an application with which the image processing apparatus 120 previously communicated is incomplete.

Subsequently, the management application 201 generates, in step S1102, input data to the image processing apparatus 120, and transmits, in step S1103 the input data to the image processing apparatus 120 via the HTTP communication module 202. After that, the management application 201 receives, in step S1105, response data from the image processing apparatus 120, and checks in step S1106 whether all data transmission/reception operations scheduled by the management application 201 are complete.

If it is determined that not all the data transmission/reception operations are complete, the process returns to step S1102 to repeat the data transmission/reception processing. On the other hand, if all the scheduled data transmission/reception operations are complete, the process is terminated.

Therefore, according to the above-described embodiment, the application operating on the information processing apparatus can terminate the processing of the image processing apparatus without detecting or predicting that the processing with the application which previously communicated with the image processing apparatus is incomplete.

Note that a print system in the above-described embodiment has an arrangement in which the information processing apparatus and the image processing apparatus are connected by USB. The present invention, however, is not limited to this. A connection form using a communication protocol having the same characteristic as that of USB, in which the start and end of a session are not clear and thus the image processing apparatus side cannot actively transmit information, may be adopted. Furthermore, communication between the information processing apparatus and the image processing apparatus is not limited to HTTP communication, and another protocol capable of performing communication by establishing a session between a server apparatus and a client apparatus in a client-server system may be adopted.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-206332, filed Oct. 25, 2017, which is hereby incorporated by reference herein in its entirety.

What is claimed is:

1. A communication apparatus that performs communication with a communication partner apparatus, comprising:
   a transmission unit configured to transmit request information for requesting information related to the communication partner apparatus, wherein the request information corresponds to first information for identifying communication with the communication partner apparatus, and the communication partner apparatus transmits second information related to response information corresponding to the request information;
   a determination unit configured to determine whether the second information transmitted from the communication partner apparatus matches the first information; and
   an instruction unit configured to transmit, if the first information and the second information do not match each other, to the communication partner apparatus, an instruction for discarding the response information related to the second information.

2. The apparatus according to claim 1, wherein the first information is a session ID specified in accordance with a communication protocol used between the communication apparatus and the communication partner apparatus.

3. The apparatus according to claim 1, wherein the first information is a parameter indicating a session ID generated by an application executed in the communication apparatus.

4. The apparatus according to claim 1, further comprising a discard unit configured to cause, if it is checked, before starting communication with the communication partner apparatus, whether another application different from an application that performs the communication has ownership of the communication partner apparatus and the other application has the ownership, the other application to abandon the ownership.

5. The apparatus according to claim 1, wherein if normal communication is executed, the communication partner apparatus transmits the response information by setting, as the second information, the first information transmitted from the communication apparatus.

6. The apparatus according to claim 1, wherein
   the communication apparatus is connected to the communication partner apparatus by USB, and
   the communication apparatus performs HTTP communication with the communication partner apparatus.

7. The apparatus according to claim 1, wherein the communication apparatus comprises an information processing apparatus including one of a personal computer, a tablet terminal, a smartphone, and a digital camera, and
   the communication partner apparatus comprises an image processing apparatus including one of a single function printer and a multi-function printer each of which prints an image on a print medium based on image data generated by the information processing apparatus.

8. A communication method for a communication apparatus that performs communication with a communication partner apparatus, the program comprising:
   transmitting request information for requesting information related to the communication partner apparatus, wherein the request information corresponds to first information for identifying communication with the communication partner apparatus, and the communication partner apparatus transmits second information related to response information corresponding to the request information;
   determining whether the second information transmitted from the communication partner apparatus matches the first information; and
   transmitting, if the first information and the second information do not match each other, to the communication partner apparatus, an instruction for discarding the response information related to the second information.

9. The method according to claim 8, wherein the first information is a session ID specified in accordance with a communication protocol used between the communication apparatus and the communication partner apparatus.

10. The method according to claim 8, wherein the first information is a parameter indicating a session ID generated by an application executed in the communication apparatus.

11. The method according to claim 8, further comprising causing, if it is checked, before starting communication with the communication partner apparatus, whether another application different from an application that performs the communication has ownership of the communication partner apparatus and the other application has the ownership, the other application to abandon the ownership.

12. The method according to claim 8, wherein if normal communication is executed, the communication partner apparatus transmits the response information by setting, as the second information, the first information transmitted from the communication apparatus.

13. The method according to claim 8, wherein
   the communication apparatus is connected to the communication partner apparatus by USB, and
   the communication apparatus performs HTTP communication with the communication partner apparatus.

14. A non-transitory computer readable storage medium which stores a computer program to be executed in a processor of a communication apparatus that performs communication with a communication partner apparatus, the program comprising:
   transmitting request information for requesting information related to the communication partner apparatus, wherein the request information corresponds to first information for identifying communication with the communication partner apparatus, and the communication partner apparatus transmits second information related to response information corresponding to the request information;
   determining whether the second information transmitted from the communication partner apparatus matches the first information; and
   transmitting, if the first information and the second information do not match each other, to the communication partner apparatus, an instruction for discarding the response information related to the second information.

* * * * *